P. L. RATESON.
MEANS FOR PRODUCING EDIBLE CONTAINERS.
APPLICATION FILED APR. 10, 1916.

1,274,349.

Patented July 30, 1918.

INVENTOR
Pierce L. Rateson
BY
Chester Phelps Marr
ATTORNEY

UNITED STATES PATENT OFFICE.

PIERRE LAMOUREUX BATESON, OF BROOKLYN, NEW YORK, ASSIGNOR TO THE AMERICAN INGENUITIES CORPORATION, OF NEW YORK, N. Y., A CORPORATION OF NEW YORK.

MEANS FOR PRODUCING EDIBLE CONTAINERS.

1,274,349.  Specification of Letters Patent.  Patented July 30, 1918.

Application filed April 10, 1916. Serial No. 90,089.

*To all whom it may concern:*

Be it known that I, PIERRE LAMOUREUX BATESON, a citizen of the United States, and resident of the borough of Brooklyn, county of Kings, city and State of New York, have invented certain new and useful Improvements in Means for Producing Edible Containers, of which the following is a specification.

The subject of this invention is a means for producing a cup or container formed of any general outline, but produced in such a manner as to provide a receptacle for confections, pasties or any generally similar substances, and the main object is to provide means for producing a container that will have agreeable stomachic qualities.

My container and the method of producing it will be fully set forth as the specification progresses.

The following is what I consider a good means of carrying out this invention and the accompanying drawings should be considered in connection with the specification which follows.

Figure 1:
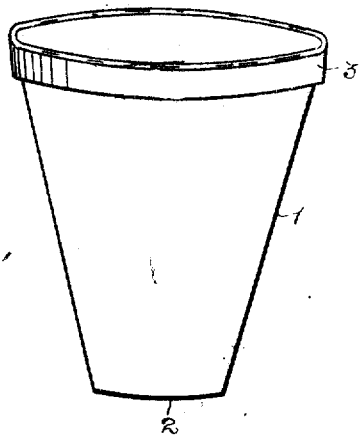

Figure 1 shows an elevation of a cup constructed according to my method.

Figure 2:
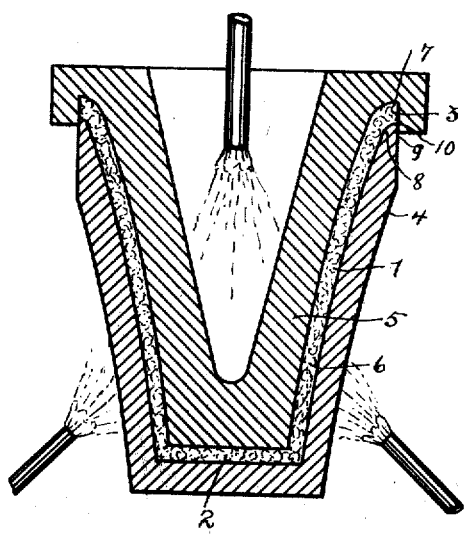

Fig. 2 a section view through the form dies and a cup contained therein.

Similar reference numerals indicate like parts in all of the figures where they appear.

The cup produced according to my invention will have a body portion as indicated at 1, and this body portion I prefer should be tapered as shown in Fig. 2. The bottom 2, of the cup should be approximately flat so that the cup may be placed upon a convenient support and will be retained in an upright position by the flattened body.

Surrounding the upper open end of the cup is a rounded flange 3, which not only adds a finish to the cup, but also gives the upper portion additional strength which is quite important in a device of this kind.

One of the principal objects of the invention is to provide a cup that shall be crisp, light, strong and readily digestible and yet for economy and rapidity of production, it is quite necessary that the cup be produced mechanically.

I have found it possible to mechanically produce such a cup and I accomplish this by the use of a plurality of metallic members arranged as a forming die.

My die consists of a socket or receiving member 4, into which a quantity of material is introduced and a second plug or shaping member 5, adapted to coöperate with the socket 4, in forming the cup.

I call particular attention to the fact that when these parts are closed together they do not compress the batter mixture 6, between them to a very great extent, but that sufficient space is provided to allow the batter mixture to become aerated by the formation of air or steam bubbles throughout the batter mixture.

At each operation the die or forming device is heated by any suitable means, such as the gas jets shown in the drawing one of which is interior of the member 5, and when the batter is introduced into the heated cup 4, the batter immediately commences to puff up or rise just as a cake does in a heated oven. The interior or forming member 5 lightly impinging upon the upper surface of the batter spreads the batter over the entire surface of the formed portions of the die and assists in raising or aerating the batter mixture.

At the upper end of the interior portion 5, of the die, I provide a recess 7, which will produce the flange 3, and I also arrange that a projection 8, of the member 4, will pass into the recess 7.

To prevent a mal-formation of the flange 3, the adjacent edges 9 and 10, of the parts 4 and 5, bear upon each other and produce a knife which will cut away any portion of the batter that may be forced out of the space between the forming member and by this means a cup is completely and perfectly formed and the web or gate to which die formed cups are commonly secured will probably not be present in my method of operation.

Although I have shown a tapered cup it will be understood that a cup of any shape or size may be produced under this invention and by my method.

Although it is obvious that the forming member may be brought closely adjacent, I prefer that a liberal space should be allowed which will result in the production of a cup having considerable thickness, as I have discovered that when the portions of a die are brought in close proximity aeration will be impossible and the cup which results will be thin, hard, crisp and indigestible. Therefore I prefer the whole as shown and described.

Having carefully and fully described my invention, what I claim and desire to secure by Letters Patent is:

1. Means for producing an edible cup, consisting of a plurality of forming members spaced apart, one said member having an overhanging peripheral flange, the other said member having a straight portion slidably fitting within said flange, said flange and said straight portion being adapted to produce a sharp edge upon a cup.

2. Means for producing an edible cup comprising a forming member having a tapered exterior to assist in forming said cup, a hollowed interior to allow said member to be uniformly heated, and an overhanging peripheral flange providing a recess for shaping the edge of said cup in combination with a second forming member having a tapered hollow interior and a generally tapered exterior, the smaller ends of both said members being flattened, a straight portion formed upon said exterior and adapted to coöperate with the inner surface of said overhanging flange.

PIERRE LAMOUREUX BATESON.